United States Patent [19]

Davies, III

[11] 4,023,429

[45] May 17, 1977

[54] COMBINED BELT GUARD AND GUIDE

[75] Inventor: John W. Davies, III, Plymouth, Wis.

[73] Assignee: Gilson Bros. Co., Plymouth, Wis.

[22] Filed: Nov. 5, 1975

[21] Appl. No.: 629,197

[52] U.S. Cl. .......................... 74/242.11 R; 74/240; 74/242.15 R; 74/611

[51] Int. Cl.$^2$ ..................... F16H 7/12; F16H 7/18; F16H 7/10; F16P 1/00

[58] Field of Search ........... 74/242.11 R, 242.15 R, 74/240, 611, 242.1 R

[56] References Cited

UNITED STATES PATENTS

| | | | |
|---|---|---|---|
| 962,342 | 6/1910 | Harrell | 74/242.11 R |
| 1,367,306 | 2/1921 | De Brun | 74/242.1 R |
| 2,458,767 | 1/1949 | Cooper | 74/242.15 R |
| 2,576,605 | 11/1951 | Hupp | 74/242.11 R |
| 2,696,741 | 12/1954 | Wilkin | 74/242.1 R |
| 3,098,396 | 7/1963 | Unruh | 74/242.11 R |
| 3,226,853 | 1/1966 | Kamlukin | 74/242.15 R |
| 3,475,982 | 11/1969 | Frank | 74/242.15 R |
| 3,524,359 | 8/1970 | Buchwald | 74/242.11 R X |
| 3,796,275 | 3/1974 | Bouyer | 74/242.1 R X |

Primary Examiner—Leonard H. Gerin
Attorney, Agent, or Firm—Joseph P. House, Jr.

[57] ABSTRACT

A belt drive including a pulley, a belt reeved about the pulley and means for slacking the belt to disengage it from the pulley is provided with a shroud about the pulley which has portions narrowly spaced from the edges of the pulley to capture the slacked belt between the pulley and the shroud, thus to guide the belt for proper engagement with the pulley during clutching, to prevent the slacked belt from coming off of the pulley and to coact with the declutched expanded belt to maintain it out of range of the pulley in the declutched mode. The shroud has a mounting bracket and fastening means for releasably attaching the bracket to the engine block. The fastening means comprises a positioning detent which engages a portion of the engine block and a single point fastener which releasably fastens the bracket to the engine block.

4 Claims, 4 Drawing Figures

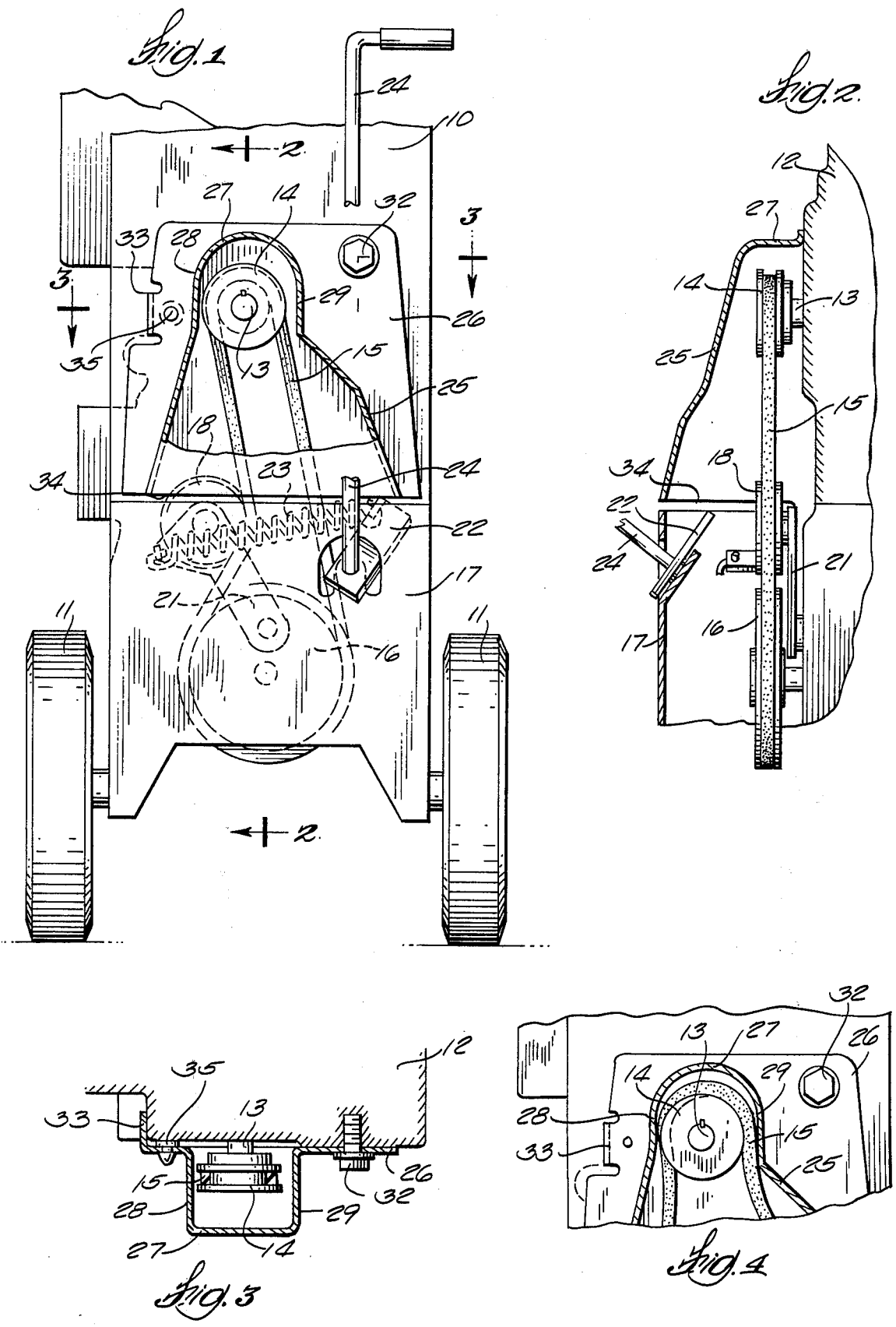

COMBINED BELT GUARD AND GUIDE

BACKGROUND OF THE INVENTION

Belt drives are typically utilized to transmit power in outdoor power equipment such as rotary tillers. A typical belt drive will be provided with an idler pulley which holds the belt taut during driving, but which may be released to permit the belt to become slack and disengage it from the pulley. The slacked belt may become so loose as to become disengaged completely from the pulley and thus lose its capacity to re-engage therewith when the idler pulley is tightened. Moreover, the slacked belt may expand where it is looped about the pulley to shorten its scope and inadvertently re-engage therewith in the declutched mode.

SUMMARY OF THE INVENTION

In accordance with the present invention, a combination guard and guide is provided, both to guard the moving parts and to guide and captivate the pulley belt so that even when slackened it will be restrained from coming completely off of the pulley and will expand into frictional contact with the guard to maintain it out of range of the pulley in the declutched mode. In accordance with the present invention, a shroud is provided which is attached to the engine block from which the shaft of the pulley projects. The shroud has portions narrowly spaced from the edges of the pulley, thus to captivate the slacked belt between the pulley and such shroud portion for the aforestated purposes.

In preferred embodiments of the invention, the shroud has a bracket or plate by which it is mounted directly on the engine block. The shroud has a positioning detent at one side of the bracket and which engages a portion of the engine block, and a releasable fastener at the other side of the bracket for releasably attaching the bracket to the engine block. Desirably, a single fastener is utilized to facilitate quick mounting and dismounting of the shroud. The combination of the fastener and the positioning detent holds the shroud in proper relationship to the pulley so that the narrow spacing between the pulley and the shroud walls thereabout is established and maintained.

Other objects, features and advantages of the invention will appear from the disclosure hereof.

DESCRIPTION OF THE DRAWINGS

FIG. 1 is a rear view of a rotary tiller having a belt drive and combined guard and guide embodying the present invention. A portion of the shroud is cut away and shown in cross section to expose interior details.

FIG. 2 is a cross section taken along the line 2—2 of FIG. 1.

FIG. 3 is a cross section taken along the line 3—3 of FIG. 1.

FIG. 4 is a fragmentary view similar to FIG. 1 and showing the position of the belt after it has been slacked.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

FIG. 1 is a rear view of a rotary tiller (the tilling mill not being visible in this view). The tiller comprises a frame 10 supported on the wheels 11. The tiller is provided with an internal combustion engine which has a block 12. From the block 12 projects a shaft 13 which carries a pulley 14 in driving engagement with a belt 15. Belt 15 is also reeved about a driven pulley 16 which is enclosed in a housing 17. Pulley 16 is part of the drive transmission to the tiller tines (not shown).

Belt 15 is subject to the pressure of an idler pulley 18 which is mounted on a swing arm 21 as actuated by spring 23 connected to the swing lever 22 and subject to control handle 24. When handle 24 is turned to tighten spring 23, it resiliently biases idler pulley 18 against belt 15 to tighten the belt against drive pulley 14. When handle 24 is turned to slacken spring 23, it permits idler pulley 18 to move away from belt 15 and hence slacken belt 15.

Thus, when the idler pulley 18 is swung to a relaxed position in which it no longer exerts pressure against the belt 15, the belt slackens and becomes loose on the pulley 14. The possibility exists that under certain circumstances belt 15 could come off of the pulley and thus lose its capacity to re-engage therewith when the idler pulley is tightened. Moreover, the slacked belt may expand where it is looped about the pulley to shorten its scope and inadvertently re-engage therewith in the declutched mode.

In accordance with the present innvention, the belt 15 is both guarded and captivated by the shroud 25 which comprises an enclosure for the belt 15 and pulley 14. Shroud 25 is provided with a mounting plate, base or bracket 26 by which it is mounted on the engine block 12.

Shroud 25 is uniquely formed in that it has a guide portion 27 about the pulley 14. Diametricallyy opposite wall portions 28, 29 of the guide portion 27 of shroud 25 are narrowly spaced from the edges of the pulley 14. There is insufficient room between the pulley edges and the shroud wall portions 28, 29 for the belt 15 to escape from the embrace of the flanges on the pulley, when the belt is slackened, as is illustrated in FIG. 4. This insures that when idler pulley 18 is pressed against belt 15 to restore drive, the belt will re-engage pulley 14 without danger of jumping off the pulley.

Moreover, the inherent resiliency of the belt 15 causes it to expand into a larger loop about the pulley 14, when the idler pulley 18 is declutched. Absent the guard 27, this expansion could take up the belt slack and shorten the scope of the belt so that the belt would inadvertently re-engage the drive pulley in the declutched mode. This would be undesirable as the tilling mill would be inadvertently re-engaged. The narrow spacing between the guard portions 28, 29 and drive pulley 14, however, causes the declutched expanded belt to frictionally engage the guard, as shown in FIG. 4, thus maintaining the belt out of range of the pulley 14 in the declutched mode. Thus the guard causes the belt to blouse about the pulley.

The shroud 25 is easily applied to and removed from the engine block, thus to facilitate reeving the belt, replacing broken belts, etc. A single fastener such as the bolt 32 attaches one corner of the plate or bracket 26 to the engine block 12. At its opposite side, a bracket 26 is provided with an abutment tab or positioning detent 33 which engages the side of the engine block. Accordingly, in its mounted position, the shroud 25 is properly located on the engine block to locate guard portion 27 in proper spaced relationship to the pulley 14. A rubber bumper 35 is desirably provided to provide cushioned support for the bracket 26.

The open end 34 of the shroud 25 is closely spaced with respect to the correspondingly open end of the housing 17 for the belt drive mechanism and together the belt drive housing 17 and shroud 25 provide a complete guard housing for the belt 15.

Inasmuch as the spacing between the edges of pulley 14 and the shoulders 28, 29 of the shroud guide portion 27 is less than the width of belt 15, it is desirable to remove the shroud 25 from the engine block 12 to replace the belt. The quick shroud detach feature utilizing the single bolt fastener 32 greatly facilitates shroud removal and replacement.

An important advantage of the invention is that the belt drive will not function properly unless the guard is in place. If it is removed, the belt may disengage completely from the drive pulley 14, or may make contact with the pulley in the declutched mode. Accordingly, the operator has substantial incentives not to remove the guard, thus enhancing the safe use of the implement.

While the illustrated embodiment relates to a rotary tiller, it is clear that the invention is applicable to other implements utilizing a belt drive.

What is claimed is:
1. In a belt drive comprising a pulley, a belt reeved about the pulley and means for slacking the belt to disengage it from the pulley, the improvement for both guarding and guiding the belt and comprising a shroud enclosing the pulley, said shroud having guide portions narrowly spaced from the edges of the pulley to captivate the slacked belt between the pulley and said shroud portions in the declutched mode.

2. The belt drive of claim 1 in combination with an engine which drives said pulley, said engine having a block and a shaft which supports said pulley adjacent said block, said shroud having a mounting bracket and fastening means for releasably attaching the bracket to the block to position the shroud with respect to the pulley.

3. The belt drive of claim 2 in which said fastening means comprises a positioning detent at one side of the bracket engaging a portion of the engine block and a releasable fastener at the other side of the bracket to releasably attach the bracket to the engine block.

4. The belt drive of claim 1 in which the said pulley is a driving pulley for the belt drive, said shroud having portions over the top and sides of the pulley, said guide portions comprising the sides of the shroud.

* * * * *